Dec. 12, 1961    B. MINAKOVIC    3,013,177
TRAVELLING WAVE TUBES
Filed Dec. 2, 1958    5 Sheets-Sheet 1

Inventor
B. MINAKOVIC
By
Attorney

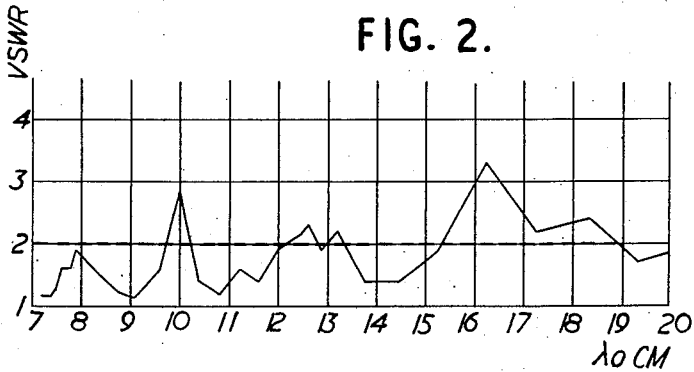
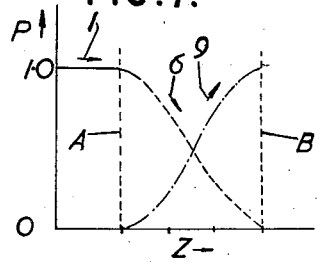 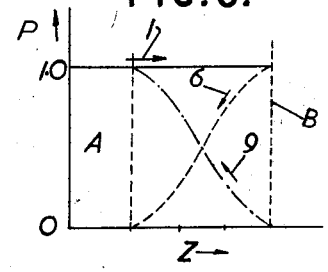
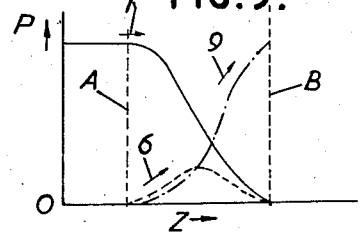

3,013,177
TRAVELLING WAVE TUBES

Borivoje Minakovic, London, England, assignor to International Standard Electric Corporation, New York, N.Y., a corporation of Delaware
Filed Dec. 2, 1958, Ser. No. 777,638
Claims priority, application Great Britain Jan. 16, 1958
6 Claims. (Cl. 315—3.5)

The present invention relates to coupled helices for feeding radio frequency energy to or from a traveling wave tube in which tube an electron beam interacts with electro-magnetic waves propagated along a helix slow wave structure. The term "travelling wave tube" is herein taken to include helix type backward wave oscillator tubes.

The conventional contrawound helix coupler as used as a travelling wave tube feeder consists of a helix wound externally over the glass envelope of the travelling wave tube about the internal, or main, helix with oppositely directed pitch dimensioned so that the propagation constants of the two helices, when uncoupled, are substantially the same, at least as regards phase velocity. One end of the outer helix is connected to a coaxial transmission line, the other is left unconnected. If the outer helix were made sufficiently long and radio frequency power were supplied to either one of the helices, it would be found that power flowed back and forth between the driving and the driven helix with spatial periodicity, so that if graphs were plotted relating the power being transmitted by each helix as functions of axial distance, they would exhibit a "spatial beating" with a characteristic beat wavelength $\lambda_b$. If the coupler be made a half beat wavelength long, power is completely transferred from the driving to the driven helix and such a length is, therefore, normally chosen for a contrawound helix coupler. Furthermore the coupler is a directional device and if all power is transferred to the driven helix the coupler itself provides a substantially reflectionless termination for the main helix without the employment of other terminating means. The bandwidth over which the contrawound helix coupler is effective depends largely on the relative diameters of the two helices. In general this ratio should be made as small as possible, for which reason this type of coupler has normally been used, heretofore, only in those cases where the main helix is directly supported by the tube envelope; for the commonly employed type of construction in which the main helix is supported by a set of surrounding parallel dielectric rods, the ratio of diameters of main and coupling helix becomes too large to permit the efficient use of the device. The limitations in this respect are brought out by the design considerations given below.

The diameter and pitch of the main helix are determined by the frequency of operation and the desired beam voltage, which latter determines the mean velocity of the beam electrons. The diameter, length and pitch of the outer helix are then chosen to give the required match between the two helices. The minimum value of the outer helix diameter is limited by the size of the glass tubing of the envelope. Although a wide range of outer helix diameters will give a satisfactory match over a relatively narrow band, provided that the coupling length is adjusted accordingly, it can be said that, in practice, the ratio of outer/inner helix diameter should not be much greater than 1.5–1.5:1. The tighter coupling, when the helices are close together, gives a shorter beat wavelength and the length of the coupler is accordingly reduced. The following figures apply to a typical 3000 mc./s. travelling wave tube: (Interaction helix mean diameter=0.10 inch).

| Ratio of diameter: | $\lambda_b/2$ (cm.) |
|---|---|
| 1.5 | 0.37 |
| 2.0 | 0.75 |
| 3.0 | 1.50 |

It can be seen that the large diameter ratios require a considerably greater coupling length, and correspondingly, as one might expect, the bandwidth over which a good coupling is obtained is small. Moreover, the power transfer will be complete for a fixed velocity of propagation, given any particular diameter ratio, which velocity may not correspond to the desired electron beam voltage. The effect of dielectric between the helices has been neglected in the figures quoted above; the presence of the glass envelope of the travelling wave tube would, if taken into account, make the smaller ratios even more desirable.

The expedient of supporting a travelling wave tube helix between ceramic rods ensures that dielectric loading of the helix is small and does not affect the gain of the tube. It has thus much to commend it. Taking into account that the surrounding glass envelope must be sufficiently robust to withstand normal handling and transport, it can be accepted that if the conventional rod support for the main helix be used it is well nigh impossible to provide contrawound helix coupling, as heretofore known, with a diameter ratio less than 2:1, whereas for efficient use this ratio should not exceed 1.5–1.5:1.

It is an object of the present invention to provide a contrawound helix coupler arrangement for travelling wave tubes which shall be effective even when the diameter ratio of outer to main helix is greater than 2:1.

This is achieved, in accordance with the invention, by providing an intermediate helix within the travelling wave tube envelope; the intermediate helix is of larger diameter than the main helix and may be brought quite close to the glass envelope. It may be wound as an extension to the main helix, being coupled thereto by direct connection, or may be wound over the end of the main helix. In the latter case it may be similarly directed in pitch to the main helix, coupling being provided by direct connection, or it may be contrawound, preferably without direct connection. The outer helix is, in any case, contrawound with respect to the intermediate helix. The intermediate helix may conveniently be wound over the main helix support rods.

Embodiments of the invention will be described with reference to the accompanying drawings in which:

FIGS. 1a, 3a, 4a and 5a show, diagrammatically, longitudinal sections of a travelling wave tube according to the invention with various alternative arrangements of the intermediate and outer helices;

FIGS. 1b, 3b, 4b and 5b each show a cross-section through the line A—A of the respective arrangements of FIGS. 1a, 3a, 4a and 5a.

FIG. 2 shows a graph of voltage standing wave ratio versus free space wavelength measured in an experimental coupler arranged as in FIG. 1;

FIGS. 7, 8 and 9 show graphs illustrating the amount and the direction of power flow in the windings of the several coupler arrangements of FIGS. 1, 3, 4, 5 and 6.

Figure 1A:
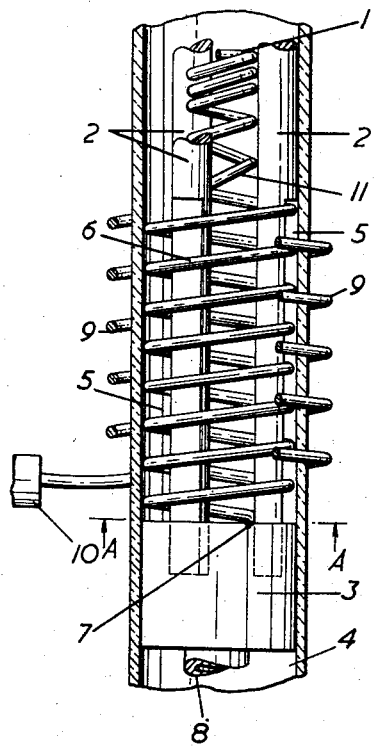
Figure 1B:
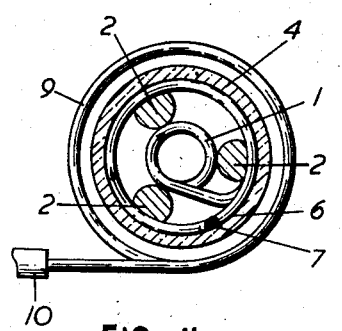

In each of the travelling wave tubes of the constructional figures of the drawings the main helix, which interacts with the electron beam, is indicated at 1. The helix 1 is supported by three ceramic support rods 2 and these support rods are themselves supported by radio frequency choke sleeve members 3. A glass envelope 4 closely surrounds the rods 2. Beyond the end of the helix 1, or about the end portion of this helix, in the other arrangements shown, the outer surfaces of the support rods 2 are ground down to leave a space 5 between them and the envelope 4 for reception of an intermediate helix 6 wound over the support rods. In FIGS. 1, 5 and 6 a D.C. connection for the main helix is made at 7 to the sleeve member 3. In FIGS. 1, 3 and 4 the intermediate helix is continuous with the main helix, but is a separate winding in FIGS. 5 and 6.

A hollow tube 8 is connected to the sleeve member 3 and surrounds the electron beam as a radio frequency shield beyond the end of the main helix.

In all the arrangements illustrated an outer helix 9, wound around the outside of the envelope 4, serves to couple the intermediate helix 10 and is contrawound with respect to the direction of winding of helix 6. In order to match the impedance of the outer helix to that of the coaxial line feeder, the feeder 10 is surrounded, in practice, by a conducting surface which, to simplify the drawings, has been omitted from FIGS. 1, 3, 4 and 5. The outer conductor of feeder 10 is connected to this surface, the inner conductor being continuous with the outer helix 9.

In the arrangement of FIG. 1 the intermediate helix 6 is a simple continuation of the main helix, the wire being wound around the rods 2 in the space 5 instead of within the rods. The pitch of the winding is chosen so that the phase velocity along 6 is the same as that long helix 1. In order to smooth out the impedance discontinuity at the transition between the two differently dimensioned windings, the last few end turns of the main helix 1 are pulled out as indicated at 11. Because of its distance from the beam, there will be little interaction between the waves on helix 6 and the electron beam. If desired the hollow tube 8 may be extended within the intermediate helix up to the transition with the main helix.

The outer helix 9 is dimensioned to have the same phase velocity as the intermediate helix, but is wound in the opposite direction. The directions of winding of the three helices are indicated by the arrows in FIG. 1b. As viewed in FIG. 1b the direction of winding of the main helix and intermediate helix is clockwise, the outer helix being wound anticlockwise.

In a practical embodiment of the arrangement of FIG. 1 the main helix was wound of 0.010 inch diameter molybdenum wire at 50 turns per inch to a mean diameter of 0.095 inch. The intermediate helix was wound with the same wire, as a continuation of the main helix, at 17 turns per inch over a mean diameter of 0.232 inch and was 9½ turns long. The last three turns of main helix 1 were stretched to provide a smooth impedance transition between the helices 1 and 6. The outer helix was wound of 0.020 inch molybdenum wire at 10 turns per inch over a mean diameter of 0.345 inch. The outer helix 9 was surrounded by a radio frequency shield (not shown) spaced so that the outer helix matched a 50 ohm coaxial line. The voltage standing wave ratio curve measured for this arrangement is reproduced in FIG. 2, from which it is seen that a reasonably low voltage standing wave ratio was achieved over the wave-length range from about 7.0 to 20.0 cms.

It should be noted that it is usual to terminate the outer helix of a contrawound helix coupler with an attenuating section; this was not done in making the measurements of FIG. 2. It should be explained that although, as has been stated previously, if the coupler is so designed that there is complete transfer of power between the two helices, there being no power left on the driving helix there is no wave power to cause reflections; and the manner of termination of the driving helix is immaterial; similarly, the coupler being directional, it should be unnecessary to terminate the driven helix. In practice, however, there is always some coupling loss: the small fraction of power which remains on the driving helix and the lack of perfect directivity giving rise to end reflections. Thus it is usual to include wave absorbing terminations to prevent reflection; such measures will improve the voltage standing wave ratio, but do not eliminate the coupling loss. Care must therefore be exercised in judging the effectiveness of a coupler merely by standing wave ratio measurements. In the case of FIG. 2, however, since the measurements were taken without the usual attenuating termination of the outer helix, the graph does give an indication of the efficiency of power transfer and shows that the arrangement of FIG. 1, with the dimensions given above, achieves power transfer from main helix to coaxial line feeder—or vice versa—with a coupling loss of less than 1.5 db over more than an octave of frequency with a ratio of outer/main helix diameters of more than 3½:1.

Figure 3A:
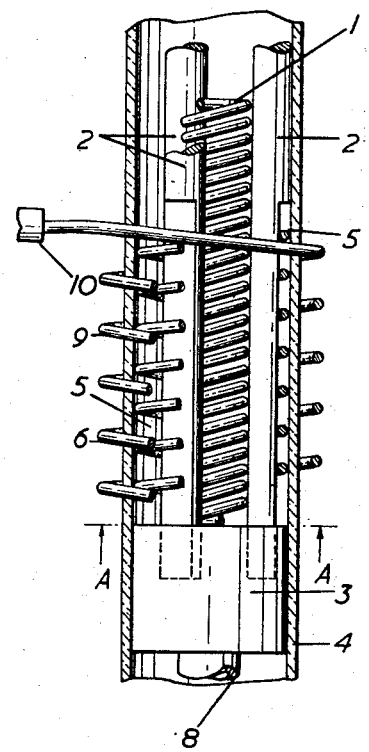
Figure 3B:
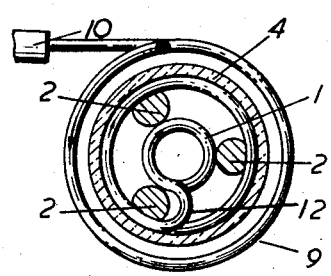

In the arrangement of FIG. 1, since there is no interaction with the electron beam over the length occupied by the coupler, the length of the electron beam path is increased by the coupler length. In general any such increase of length of the electron beam path is undesirable. In the arrangements of FIGS. 3 and 4 this disadvantage is overcome by winding the intermediate helix back over the main helix, the windings still being continuous. When this is done there is a choice of winding direction. In the arrangement of FIG. 3 at the end of the main helix the wire, as it passes one of the support rods 2, is given a half turn round this rod, as indicated at 12 in FIG. 3b, and the winding is continued, on the outside of the support rods, back over a portion of the length of the main helix. As viewed in FIG. 3b, both main and intermediate helices are wound clockwise; the outer helix 9 is then wound anticlockwise and is similar to the outer helix of FIG. 1 except that the connection to the coaxial line feeder 10 is made at the opposite end of helix 9.

Figure 4A:
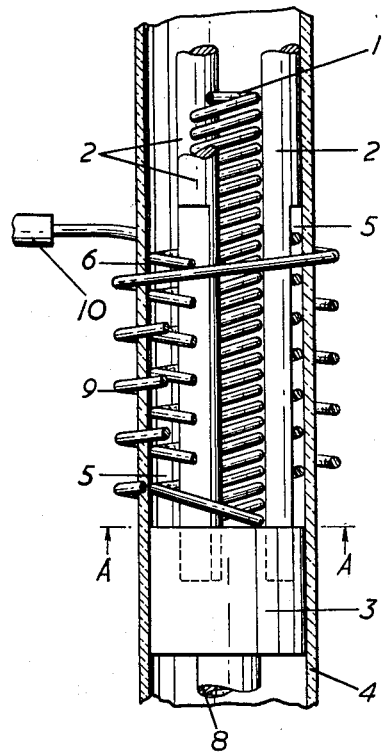
Figure 5A:
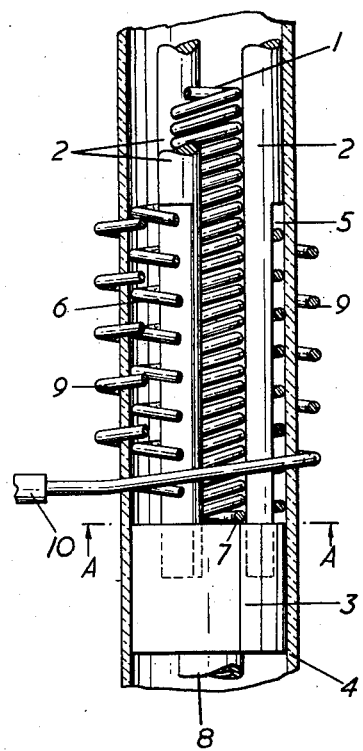
Figure 4B:
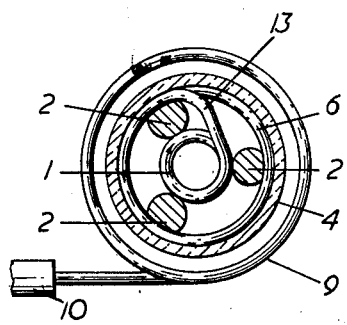
Figure 5B:
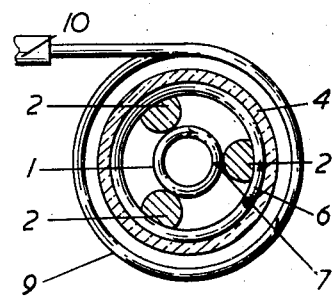

In FIG. 4, at the end of the main helix 1, the wire is taken directly, without reversal, around the outside of one of the support rods 2, as indicated at 13 in FIG. 4b, and continued back over the main helix. It will be seen that if, as before, the direction of winding of the main helix, as viewed in FIG. 4b, is clockwise, the direction of winding of the intermediate helix 6 is anticlockwise. In order to couple to the intermediate helix, the outer helix 9 of FIG. 4 must now be wound clockwise, as viewed in FIG. 4b, and consideration of the direction of power flow will show that the feeder 10 must be connected to the top end of 9, as viewed in FIG. 4a. To assist in the appreciation of the directions of power flow in these alternative embodiments of the invention reference will be made to the graphs of FIGS. 7 and 8. Before proceeding to consider these, however, the arrangement of FIGS. 3 and 4 requires some further discussion.

In FIG. 3, since the intermediate helix 6 and the main helix 1 have the same directions of winding, there will be no coupling between the helices except by way of the common connection at 12. In FIG. 4, however, since the intermediate helix is contrawound with respect to the main helix, there exists also the possibility of electromagnetic coupling between the two windings. This is undesirable; for then, power would tend to flow in the intermediate helix in the opposite direction to that from the direct connection at 13. Since the condition for electromagnetic coupling between a pair of contrawound helices is that the velocity of wave propagation in each should be the same, it is necessary, in the arrangement of FIG. 4, to ensure that the wave propagation velocities in helices 1 and 6 be different. This restriction is unnecessary in FIG. 3. In other respects, in both FIGS. 3 and 4, the intermediate helix may be dimensioned independently of the main helix.

Turning now to FIGS. 7 and 8, here the proportion P of the total power in a coupler according to the invention which flows in each of the three helices is plotted as a function of axial distance z along the main helix, z increasing towards the end of the helix. Since only the coupler action, and not that of the electron beam, is being considered, the effect of the latter on the growth of power in the main helix is ignored. It is assumed that a signal is injected into the main helix and the value of P is unity between the point of injection and the coupler. The coupler extends from A to B, the value of z being greater at B than at A. In the arrangement of FIG. 1 the main helix ends at A and power is flowing, in the main helix, with a value of $P=1$, from left to right in FIG. 7, as indicated by the arrow 1. From A power flows along the intermediate helix 6 from left to right and is picked up on the outer helix 9 to flow in the same direction. The value of P in helix 6 at any value of z is given by the dashed curve and P for helix 9 by the chain line curve, the direction of power flow being indicated by the arrows 6 and 9 respectively. In the intermediate helix 6, P has the value 1 at A, where it is directly joined to the main helix, and the value of P decreases to zero at B, the power having been transferred to the outer helix. For the outer helix the value of P correspondingly starts from zero at A and becomes unity at B, assuming no coupling losses.

In FIG. 8, making the same assumptions as for FIG. 7, P is plotted against z for the arrangements of both FIGS. 3 and 4. As before the arrows 1, 6 and 9 show the direction of power flow in the respectively numbered helices, the full line curve is that for the main helix, the dashed curve relates to the intermediate helix and the chain line curve to the outer helix. The main helix this time extends to B and P is unity throughout its length. In the intermediate helix P is unity at B, where helices 1 and 6 are joined, and become zero at A. In helix 9 P is zero at B and becomes unity at A. Thus, whereas in FIG. 1 the connection to the feeder 10 is made at the position corresponding to B, in FIGS. 3 and 4 the feeder connection is at the opposite end of the helix 9, corresponding to position A.

Comparison of the arrows in FIGS. 7 and 8 illustrates the point that has been made regarding electromagnetic coupling between helices 1 and 6 in the description of the arrangement of FIG. 4. If there were electromagnetic coupling as well as the direct connection between helices 1 and 6 in FIG. 4, then, due to the electromagnetic coupling, power would tend to flow in 6 as in the chain line curve of FIG. 7 and in the direction of the arrow 9 in that figure; it will be seen that this would oppose the desired direction of flow indicated by the arrow 6 in FIG. 8.

From the above discussion emerges the question of whether the direct connection between helices 1 and 6 in the arrangement of FIG. 4 could not be omitted and helix 6 be dimensioned to have the same phase velocity as helix 1 so that power transfer between all three helices of the coupler is purely electromagnetic. The answer is that this is indeed possible, and in fact, represents our preferred embodiment of the invention. The arrangement is illustrated in FIG. 5, which differs from FIG. 4 otherwise only in that the coaxial line feeder 10 must now be connected to the opposite end of helix 9, corresponding to the position B of FIGS. 7 and 8. From the point of view of dimensioning of the three helices, however, there are some rather important restrictions to be considered a little later. The graphs of power flow, corresponding to those of FIGS. 7 and 8, are drawn in FIG. 9. Since the two helices 1 and 9 are wound in the same direction, there is no coupling between them other than by way of the field of the intermediate helix 6. Thus, so far as the power flow in helix 1 is concerned, P will vary from A to B in the same manner as in the case of the intermediate helix in FIGS. 1 and 7. Power will flow in the intermediate helix from A to B, but since helix 6 is continuously passing on its power to the outer helix 9, and at the end B it has no power flowing in it, very little of the total power is to be found in 6 at any position between A and B, the maximum value of P in the intermediate helix rising but to ¼. The curve for the value of P in the outer helix rises slowly at first and then rises rapidly in the second half of the distance AB to reach unity at B, at which point connection to the feeder 10 is made.

Consideration of the graphs of FIGS. 7, 8 and 9 show immediately that if a D.C. connection is to be made to the main helix in the region of the coupler, or to the intermediate helix, in the arrangement of FIG. 1 connection should be made at the end B, as at 7 in FIG. 1. In the arrangement of FIG. 5, connection should again be made at B, so that, if desired, both the main helix 1 and the intermediate helix may be joined to the sleeve member 3. In the arrangements of FIGS. 3 and 4 a D.C. connection can be made to the top end (in FIGS. 3a and 4a) of the intermediate helix 6, corresponding to the position A of FIG. 8 at which there is no power flow on 6. In FIG. 5 the intermediate helix can be connected to a D.C. lead at either end.

In the discussion with reference to FIGS. 7 to 9, it has been assumed that power flows from the main helix to the outer helix, the coupler functioning as an output feed from the travelling wave tube. If the arrows of FIGS. 7 to 9 be each reversed in direction, the graphs would hold equally well for power flow from the feeder 10 through the outer helix and the intermediate helix to the main helix. It is thus immaterial whether the arrangements of FIGS. 1, 3, 4 and 5 be considered as output or as input couplers, and the drawings can equally well be taken to represent a view of the travelling wave tube either adjacent the electron gun end or the electron collector end of the tube. In the case of a backward wave oscillator there would be only an output coupler, situated adjacent the electron gun end of the tube. For an amplifier, couplers such as described can be fitted at each end of the tube.

Returning to the consideration of the helix dimensions in FIG. 5, analysis of an equivalent helically conducting sheath model shows that each of the helices can support three fundamental forward waves having, in general, different propagation constants $\beta_1$, $\beta_2$ and $\beta_3$ respectively. The conditions for power transfer from the innermost to the outermost helix, or vice versa, are that, for each of the helices, $$\beta_2 - \beta_1 = \beta_1 - \beta_3$$

and that the coupling between main and intermediate helices be the same as that between intermediate and outer helices. The spatial beating characteristic of power transfer in the coupler can be regarded as interference between the three fundamental waves. By analogy with the conventional two helix coupler, unidirection power transfer can be achieved by discontinuing the intermediate helix after a distance $l$ cms., where $$l = \frac{\pi}{\beta_2 - \beta_1}$$

and the $\beta$'s are given in units of radians/centimetre.

As a matter of practical design the procedure indicated below results in a sufficiently approximate approach to both the above mentioned phase and coupling coefficient requirements. The phase constants, in the uncoupled condition, of the three helices are made equal and the diameter of the intermediate helix is chosen to make the coupling between main and intermediate helices equal to that between intermediate and outer helices.

Figure 10:
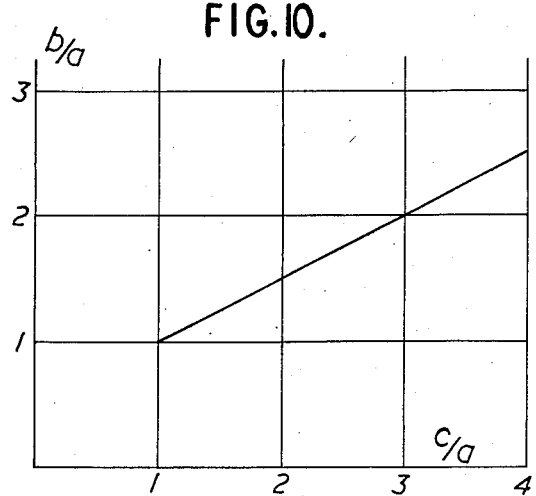
FIG. 10 shows a graph used for the practical design of the ararngements of FIGS. 5 and 6.

The radius $a$ and the pitch, and hence the phase constant, $\beta$, of wave propagation along the main helix are determined in the usual way from considerations of electron beam voltage and frequency of operation of the travelling wave tube. The radius $c$ of the outer helix is determined by the thickness of the glass envelope and the size of the ceramic support rods for the main helix. From the ratio of $c/a$ the value of $b/a$, where $b$ is the radius of the intermediate helix, is next determined to provide the equality of coupling between the three helices. For the range of values likely to be encountered in most practical designs, the required value of $b/a$ can be read off from the straight line graph reproduced in FIG. 10, in which $b/a$ is plotted as a function of $c/a$. The pitches of the intermediate helix and the outer helix are determined in the known manner to provide the same wave velocity as in the main helix.

Neglecting the effect of the dielectric of the envelope and the support rods, the length $l$ of the coupler in terms of the above parameters is given by $$l = \frac{\pi}{\beta\sqrt{2}} \exp\left\{\beta a\left(\frac{b}{a}-1\right)\right\}$$

The presence of the dielectric tends to increase $l$. Another factor which tends to increase $e$, and is even more important, is the impedance reducing radio frequency shield which has been mentioned before, but not shown in FIG. 5, normally placed about the outer helix 9. The effect of this shield is to make wave propagation along the outer helix behave in much the same way as in microstrip transmission line, where a strip conductor is closely spaced from a much wider conducting "ground plane"; the effect of the ground plane, or radio frequency shield, in this case, is to restrict the field of the "above ground" conductor—or the helix 9, in the present case—to the immediate vicinity of the "above ground" conductor. The coupling between a shielded helix 9 and the intermediate helix is thus less, per unit length, than in the case where the shield is omitted. It follows that, where space therefore can be spared, the impedance of helix 9 should be reduced to that of feeder 10 by a tapered transition section which need not be coupled to the intermediate helix. In the practical embodiment of FIG. 6, now to be described in somewhat fuller detail than in the brief references hereinbefore made to that construction, such tapering has not bee included.

Figure 6A:
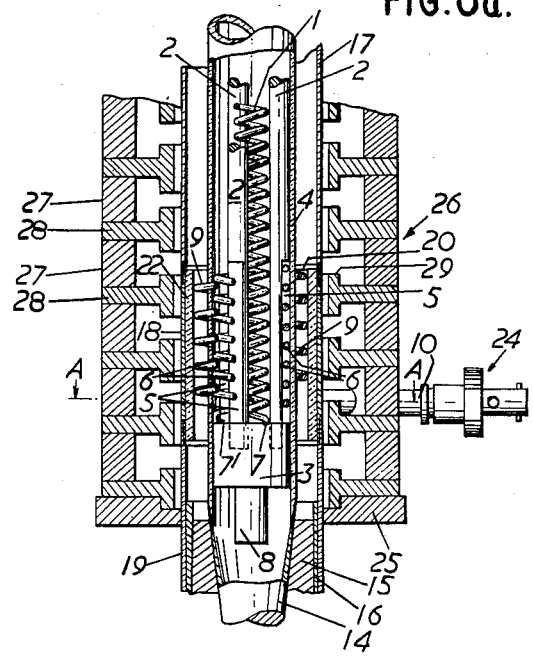
FIGS. 6a and 6b show, respectively, a longitudinal section and a cross-section through the line A—A of the output end of a preferred practical construction of a travelling wave amplifier incorporating contrawound helix couplers according to the invention.
Figure 6B:
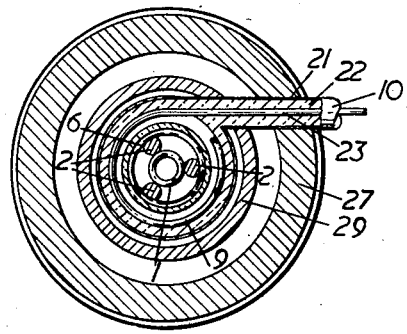

FIG. 6 shows part of the output end of a travelling wave amplifier including the tube mounting and beam focusing structure not shown on the other figures of the drawings. The travelling wave tube is the same as that illustrated in these other figures, the coupler arrangement being as in FIG. 5. In addition there is here shown at 14 an electron collector electrode in the form of a predominantly hollow frustum of a cone having a solid apex and tapering walls sealed to the end of glass envelope 4. The hollow electron beam shielding tube 8, shown only in part in the other figures, is here shown projecting within the enclosure of the electron collector electrode. The intermediate helix 6 is shown connected for D.C. purposes to the choke member 3 at 7'. The electron collector electrode seats in a tapered metal bush 15 carried in a cylindrical casing 16. The travelling wave tube is surrounded by a cylindrical shield of non-magnetic metal made in three parts 17, 18 and 19, respectively, which are joined end to end. The sleeve member 3, together with the portion of this shield surrounding it, provides a radio frequency choke preventing passage of R.F. energy from one side of the choke to the other. The casing 16 fits within the shield part 19. The shield part 18 serves as the radio frequency shield, previously mentioned, about the outer helix 9 of the output coupler and is constructed as a metal casing having annular end members 20 and receiving the outer conductor 21 (FIG. 6b) of the coaxial line feeder 10. The part 18 is lined with low loss dielectric 22 which serves as a surrounding former for the outer helix 9 and which also fills the space between the outer conductor 21 and the inner conductor 23 of the feeder 10. The inner conductor 23 is continuous with helix 9, while the outer conductor 21 is rigid and carries at its end a coaxial connector 24, shown in FIG. 6a.

The shield part 19 is carried in an end plate 25 of a permanent magnet periodic focusing assembly 26 which extends the length of the travelling wave tube and provides at its other end (not shown) support for the surrounding shield and the electron gun end of the tube.

The magnet assembly 26 comprises alternate annular magnets 27 and spacing members 28 of high permeability material. The spacing members 28 each carry integral therewith, a short flux concentrating cylinder 29 closely spaced coaxially around the shield enveloping the travelling wave tube. In order to allow passage through the outside of the magnet assembly 26, one of the magnets 27 and one of the cylinders 29 are suitably recessed. Thus the outer helix 9, together with its radio frequency shield 18 and the coaxial line feeder 10 are built in as part of the magnet assembly 26. At the input end of the assembly entirely similar arrangements are made for the input coupler to the travelling wave tube, the sub-assembly of outer helix and coaxial line feeder being duplicated.

Figure 11:
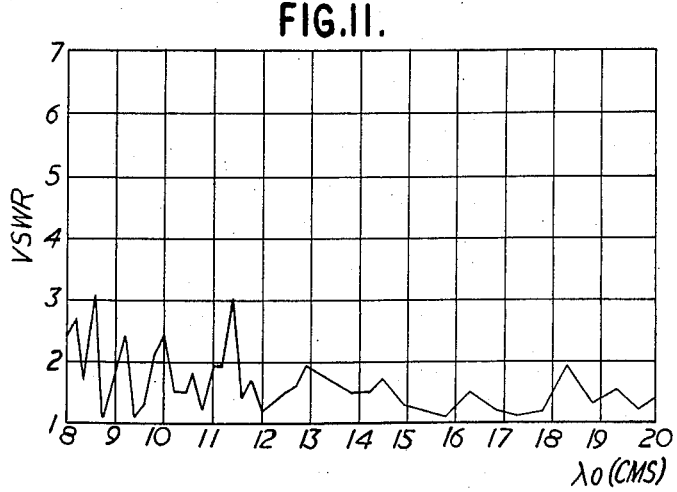
FIG. 11 shows a graph of the voltage standing wave ratio measured, without impedance match improving terminations, on the coupling arrangement of FIG. 6.

In the arrangement of FIG. 6 the ratio of outer helix main helix diameter was 3.6:1 and the coupler design followed the principles discussed in connection with FIG. 5. The voltage standing wave ratio was measured without an attenuating termination for the outer helix over the frequency range 1.5 to 3.5 K mc./s. The results are reproduced in FIG. 11, which shows that the coupler compares very favourably indeed with more conventional arrangements and, in fact, marks a decided improvement on the waveguide or coaxial line type of coupling which has hitherto been used for a rod-supported helix type of travelling wave tube.

While the principles on the invention have been described above in connection with specific apparatus, it is to be clearly understood that this description is made only by way of example and not as a limitation on the scope of the invention.

What is claimed is:

1. A contrawound helix coupler for feeding radio frequency energy to or from a traveling wave amplifier or oscillator comprising an envelope, a main helix for interaction with an electron beam within said envelope and spaced from the walls thereof, an intermediate substantially cylindrical helix of larger diameter than the main helix mounted within the said envelope in coupling relation to an end portion of the main helix, said intermediate helix being wound in the same direction as said main helix, an outer substantially cylindrical helix having a pitch direction opposite to the pitch direction of said intermediate helix coupled to and surrounding the said intermediate helix placed about the said envelope, and a terminal at one end of said outer helix for coupling to the inner conductor of a coaxial feeder line.

2. A coupler according to claim 1 in which the helical diameters of said outer helix and said main helix have a ratio lying between 1:5–1 and 2:1.

3. A coupler according to claim 1 in which the said intermediate helix is directly connected to an end of the main helix and is wound as a larger diameter continuation thereof.

4. A coupler or traveling wave tube according to claim 1, in which the said intermediate helix surrounds the said end portion of the main helix.

5. A coupler according to claim 1 further comprising a set of parallel rods of dielectric material supporting said main helix and said intermediate helix being wound about the said set of rods.

6. A traveling wave tube comprising means for producing an electron beam, a main helix supported within a surrounding vacuum envelope for interaction with said electron beam, an intermediate substantially cylindrical helix of larger diameter than the main helix mounted within the said envelope coupled to said main helix in radio frequency power transfer relation, said intermediate helix being wound in the same direction as said main helix, and an external substantially cylindrical helix having a pitch opposite to the pitch of said intermediate helix separate from the said tube placed about the said envelope in radio frequency power transfer relation with said intermediate helix, at least that portion of the envelope surrounding the intermediate helix being of dielectric material.

References Cited in the file of this patent

UNITED STATES PATENTS

| | | |
|---|---|---|
| 2,758,244 | Dodds | Aug. 7, 1956 |
| 2,767,259 | Peter | Oct. 16, 1956 |
| 2,814,779 | Mendel | Nov. 26, 1957 |
| 2,843,790 | Cutler | July 15, 1958 |
| 2,847,608 | Thornburg | Aug. 12, 1958 |
| 2,849,651 | Robertson | Aug. 26, 1958 |
| 2,862,137 | Wang | Nov. 25, 1958 |
| 2,894,168 | Wing et al. | July 7, 1959 |
| 2,905,858 | Cutler | Sept. 22, 1959 |